(12) United States Patent
Wen (10) Patent No.: US 8,656,795 B2
(45) Date of Patent: Feb. 25, 2014

(54) EASILY SWITCHABLE AUTOMATIC TRANSMISSION ECCENTRIC SHAFT

(76) Inventor: Shih-Chou Wen, Sanchong (TW)

( * ) Notice: Subject to any disclaimer, the term of this patent is extended or adjusted under 35 U.S.C. 154(b) by 475 days.

(21) Appl. No.: 12/969,603

(22) Filed: Dec. 16, 2010

(65) Prior Publication Data

US 2012/0152043 A1   Jun. 21, 2012

(51) Int. Cl.
  *F16H 33/00* (2006.01)
(52) U.S. Cl.
  USPC .................................. 74/61; 74/87
(58) Field of Classification Search
  USPC ............... 74/61, 87, 473.1, 473.36, 473.37
  See application file for complete search history.

(56) References Cited

U.S. PATENT DOCUMENTS

| | | | | |
|---|---|---|---|---|
| 2,185,602 A | * | 1/1940 | Metzler | 74/337 |
| 2,535,381 A | * | 12/1950 | Andrews | 74/473.1 |
| 2,615,346 A | * | 10/1952 | Simpson et al. | 74/375 |
| 2,902,868 A | * | 9/1959 | Ferrara | 74/87 |
| 3,097,537 A | * | 7/1963 | Peterson | 74/61 |
| 4,412,757 A | * | 11/1983 | Kummel et al. | 404/113 |
| 6,224,293 B1 | * | 5/2001 | Smith | 404/117 |
| 7,717,010 B2 | * | 5/2010 | Bar et al. | 74/473.37 |
| 2008/0134824 A1 | * | 6/2008 | Jung et al. | 74/473.1 |
| 2011/0023649 A1 | * | 2/2011 | Kim et al. | 74/473.36 |
| 2011/0138954 A1 | * | 6/2011 | Tokunaga et al. | 74/473.1 |
| 2012/0096972 A1 | * | 4/2012 | Retsch | 74/473.36 |
| 2012/0204669 A1 | * | 8/2012 | Birk et al. | 74/473.36 |

FOREIGN PATENT DOCUMENTS

WO   WO 2009015596 A1 *  2/2009

* cited by examiner

*Primary Examiner* — David M Fenstermacher
*Assistant Examiner* — Zakaria Elahmadi
(74) *Attorney, Agent, or Firm* — Jackson IPG PLLC (57) ABSTRACT

An easily switchable automatic transmission eccentric shaft includes an input shaft over which a movable centrifugal saddle is fit. An elastic body is arranged between the centrifugal saddle and the input shaft. The centrifugal saddle is provided at one side thereof with an openable weight assembly, which selectively moves the centrifugal saddle with respect to the input shaft. A balance weight is coupled to one side of the weight assembly. The balance weight forms a limiting structure that includes two retention members and an elastic element between the retention members. The limiting structure helps controlling preciseness of variable transmission, helps increasing available transmission positions, facilitates the weight assemblies returning back to home positions, and is suitable for high horsepower applications.

9 Claims, 11 Drawing Sheets

EASILY SWITCHABLE AUTOMATIC TRANSMISSION ECCENTRIC SHAFT

TECHNICAL FIELD OF THE INVENTION

The present invention generally relates to variable automatic transmission mechanism, and more particularly to an easily switchable automatic transmission eccentric shaft that helps controlling preciseness of variable transmission, helps increasing available transmission positions, facilitates the weight assemblies returning back to home positions, and is suitable for high horsepower applications.

DESCRIPTION OF THE PRIOR ART

For transportation vehicles, continuous variable transmission systems are transmission of the next generation, which functions to effect continuous and stepless switching of speed during the travel of the transportation vehicle for ensuring smooth driving and saving of fuel. Further, they are of simple structure and are easy to maintain, making it possible to simplify the construction of the vehicle, improve the performance of the vehicle, and reduces the consumption of energy. Further, since the variable transmission systems are characterized by their behavior of continuous variable transmission, there is no jerk occurring in the conventional transmission systems, thereby ensuring better controllability and comfortableness. Apparently, the variable transmission systems have a potential and promising future of application in vehicle transmission system.

Although various variable transmission mechanisms are known, the present invention aims to provide a further improvement on the variable transmission mechanism.

SUMMARY OF THE INVENTION

An object of the present invention is to provide an easily switchable automatic transmission eccentric shaft that helps controlling preciseness of variable transmission, helps increasing available transmission positions, facilitates weight assemblies returning back to home positions, and is suitable for high horsepower applications. Structurally, the present invention comprises an input shaft, a centrifugal saddle, a weight assembly, and a balance weight. The input shaft receives power input from a prime mover to rotate. The input shaft forms two flat sections on opposite sides thereof. The centrifugal saddle is fit over the flat sections and is movable with respect to the input shaft. An elastic body is arranged between the centrifugal saddle and the input shaft. An outer ring is fit over and houses the centrifugal saddle. The weight assembly is arranged at one side of the centrifugal saddle. The weight assembly forms an openable pivot connection portion. The weight assembly selectively drives the movement of the centrifugal saddle with respect to the input shaft. The balance weight is arranged at one side of the weight assembly and is coupled to the weight assembly. The feature is that the weight assembly forms a limiting structure, which comprises two retention members and an elastic element arranged between the retention members, whereby the limiting structure helps controlling preciseness of variable transmission, helps increasing available transmission positions, and facilitates the weight assemblies returning back to home positions.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
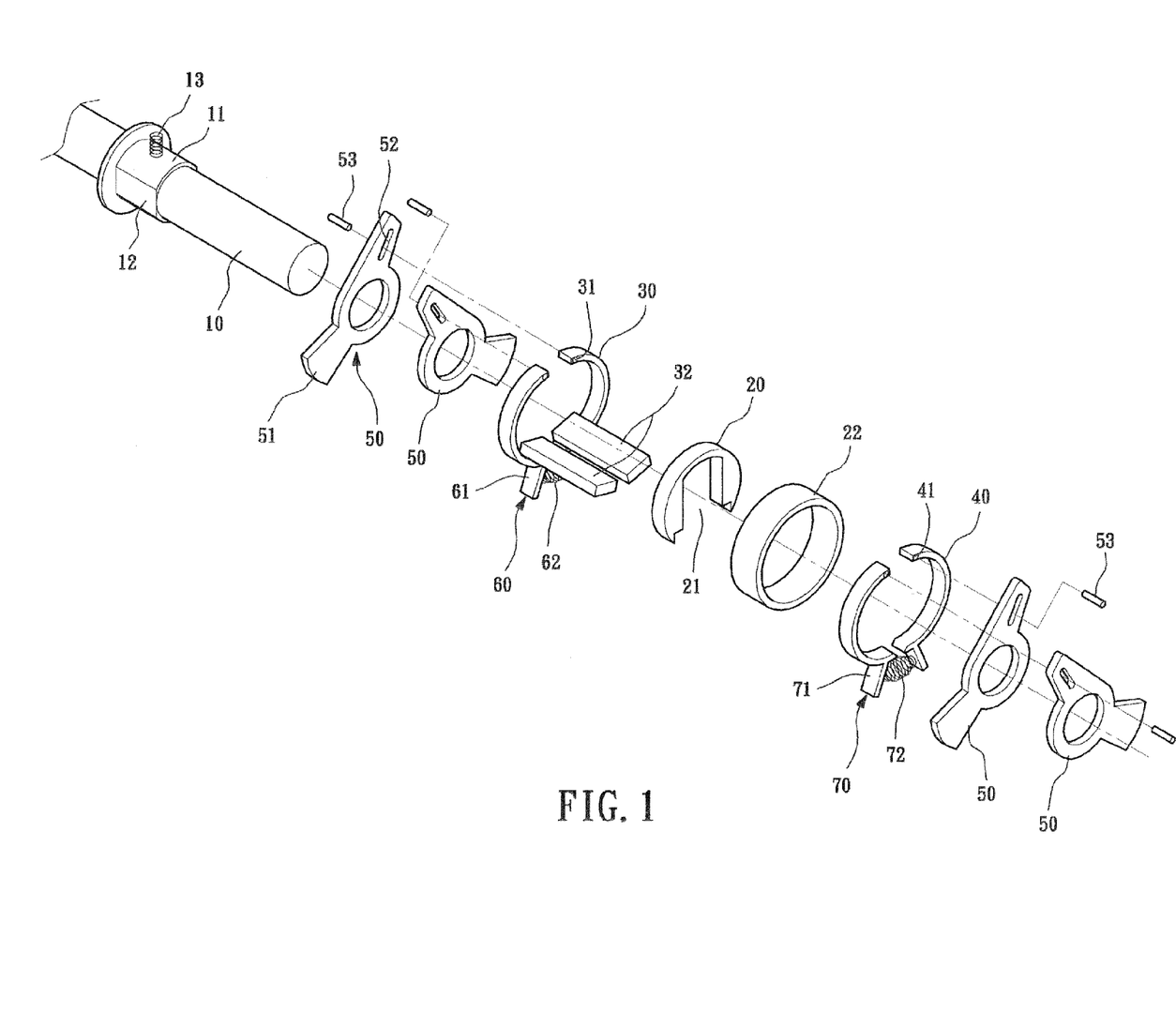
FIG. 1 is an exploded view of the present invention.
Figure 3:
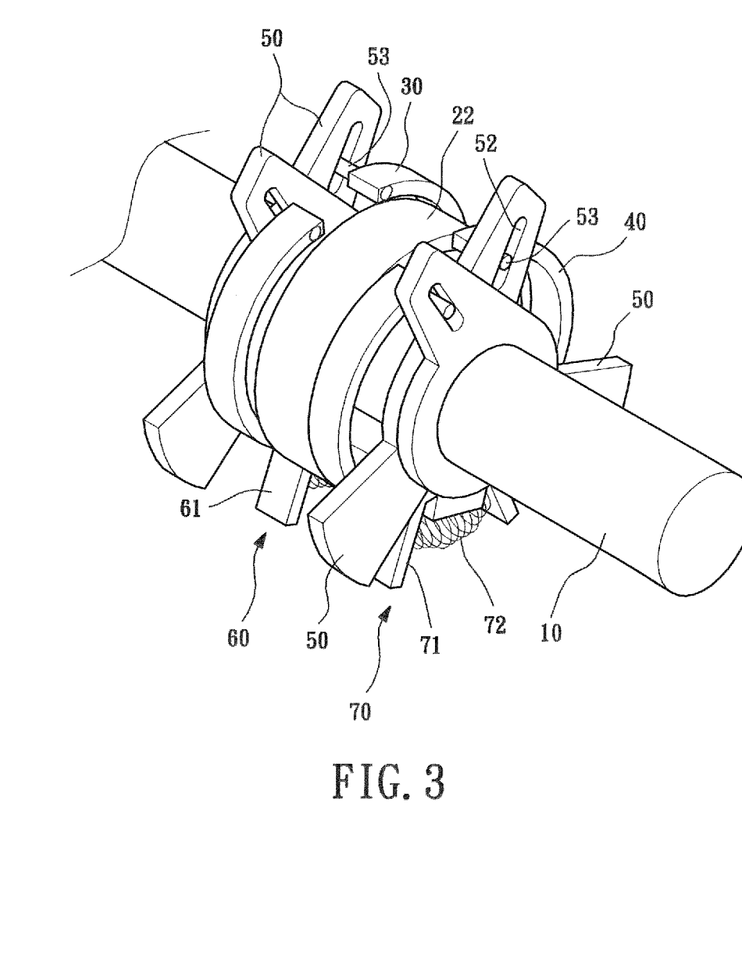
FIG. 3 is a perspective view of the present invention.

Referring to FIGS. 1 and 3, the present invention comprises an input shaft 10, a centrifugal saddle 20, two weight assemblies 30, 40, and a plurality of balance weights 50. The weight assemblies 30, 40 each comprise a limiting structure 60, 70. The limiting structure 60, 70 helps controlling preciseness of variable transmission and also helps increasing available transmission positions and also facilitates the weight assemblies returning back to home positions and is suitable for high horsepower applications.

The input shaft 10 is rotatable by being driven by a prime mover. The input shaft 10 forms a carrying seat 11, which has two flanks respectively forming a flat section 12.

The centrifugal saddle 20 forms a notch 21, which is fit over the flat sections 12 and is movable with respect to the input shaft 10. An elastic body 13 is arranged between the centrifugal saddle 20 and the input shaft 10. The centrifugal saddle 20 is received in and housed by an outer ring 22.

The weight assemblies 30, 40 are respectively arranged on opposite sides of the centrifugal saddle 20. Each of the weight assemblies 30, 40 forms a pivot connection portion 31, 41, which is of an openable/closable arrangement. The weight assembly 30 comprises two driving portions 32 that extend through the centrifugal saddle 20. The driving portions 32 also extend through and support the weight assembly 40 thereon.

The balance weights 50 are grouped in such a way that each group contains two of the balance weights and the groups are respectively set by one side of the weight assemblies 30, 40. Each balance weight 50 comprises a weight section 51 and a traction section 52. The balance weights 50 are arranged to have the weight sections 51 and the traction sections 52 alternating each other. The traction section 52 of each balance weight is connected by a pin 53 to the associated pivot connection portion 31, 41.

Figure 2:
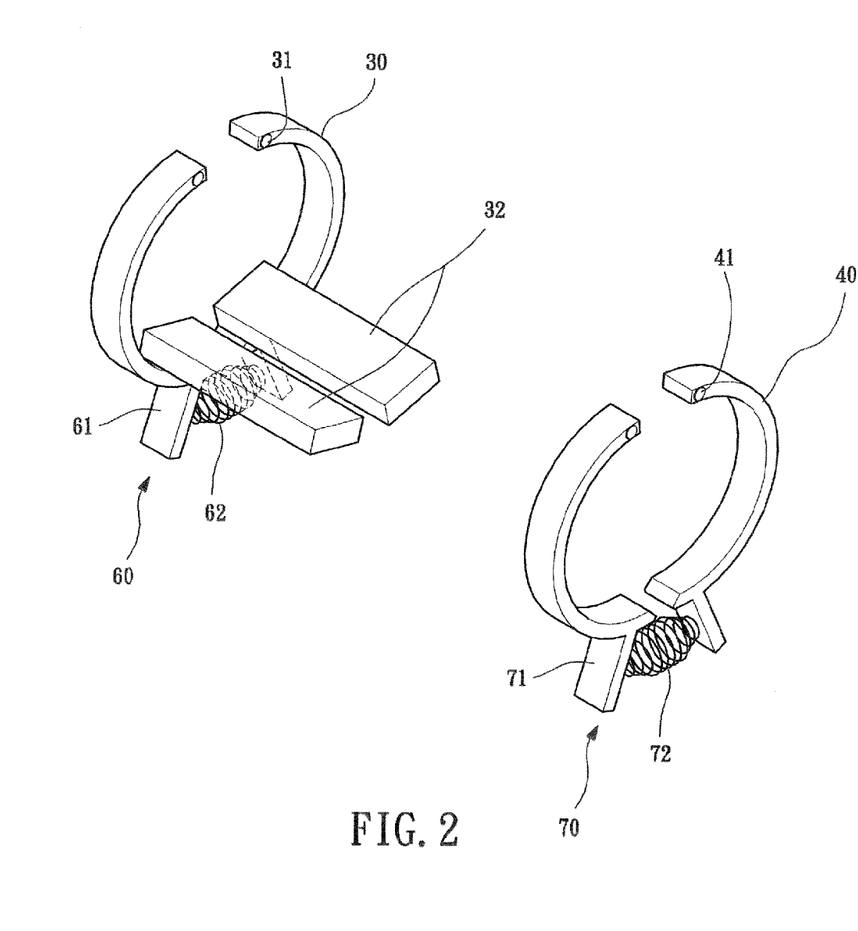
FIG. 2 is a perspective view of limiting structures according to the present invention.

Referring to FIGS. 1 and 2, according to the present invention, the limiting structure 60, 70 comprises two retention members 61, 71 extending from the weight assembly 30, 40 and an elastic element 62, 72 retained between the two retention members 61, 71. Preferably, the elastic element 62, 72 is of a barrel shape showing variable elastic coefficient.

Figure 4:
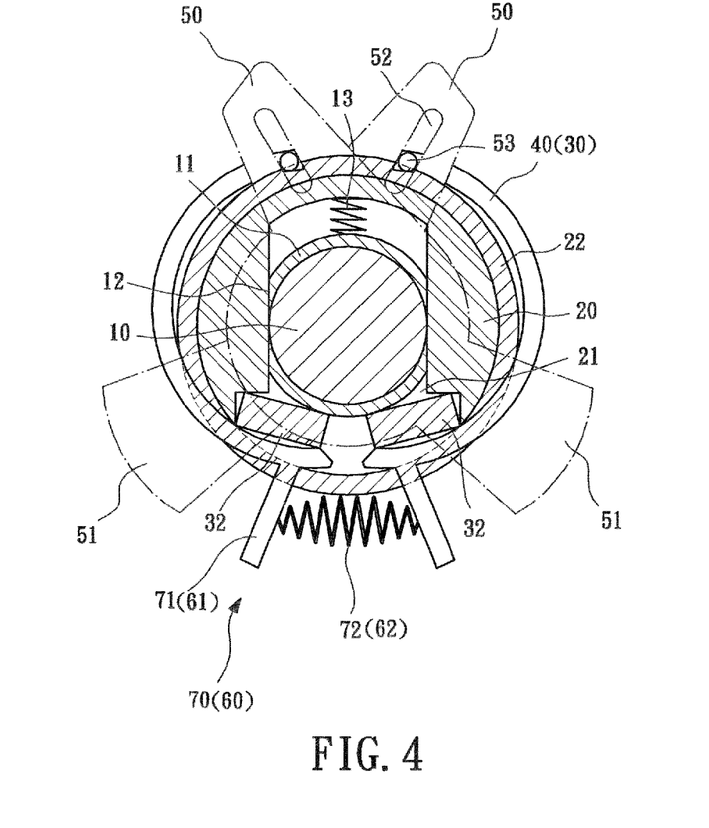
FIG. 4 is a cross-sectional view of the present invention.
Figure 5:
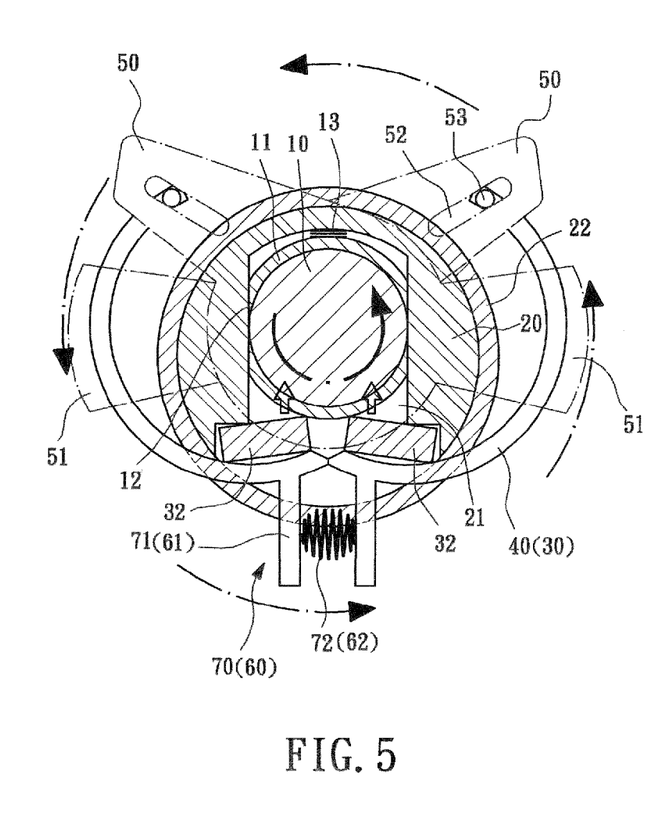
FIG. 5 is a cross-sectional view illustrating the operation of the present invention.

Referring to FIGS. 3, 4, and 5, when the input shaft 10 is driven by the prime mover and is rotating, the balance weights 50 provide an effect of balancing, and a centrifugal force is induced on the weight assemblies 30, 40 to have upper ends (as viewed in FIGS. 4 and 5) thereof widely opened, causing the driving portions 32 to push against the carrying seat 11 so as to make the centrifugal saddle 20 and the outer ring 22 to move in a vertical direction (as viewed in FIGS. 4 and 5), namely radial direction of the input shaft, with respect to the flat section 12 of the carrying seat 11. When the centrifugal saddle 20 moves downwards, the elastic body 13 is compressed on the carrying seat 11, and a driving disc (not shown) coupled to the outer ring 22 makes positional variation that automatically adjusts eccentricity with respect to the input shaft 10. As such, through the centrifugal force induced by the rotation of the input shaft 10, displacement of the weight assemblies 30, 40 in a radial direction is realized.

When the weight assemblies 30, 40 make the radial displacement, a constraining effect is induced between the retention members 61, 71 and the elastic element 62, 72 of each of the limiting structures 60, 70, for the retention members 61, 71 are caused to move and thus push inwards, and the movement is constrained by the spring force of the associated elastic element 62, 72, whereby the extent of opening (and outward movement) of the weight assembly 30, 40 is constrained and prevented from being excessive, and thus helps controlling preciseness of variable transmission and also helps increasing available transmission positions and also facilitates the weight assemblies returning back to home positions and is suitable for high horsepower applications.

Figure 6:
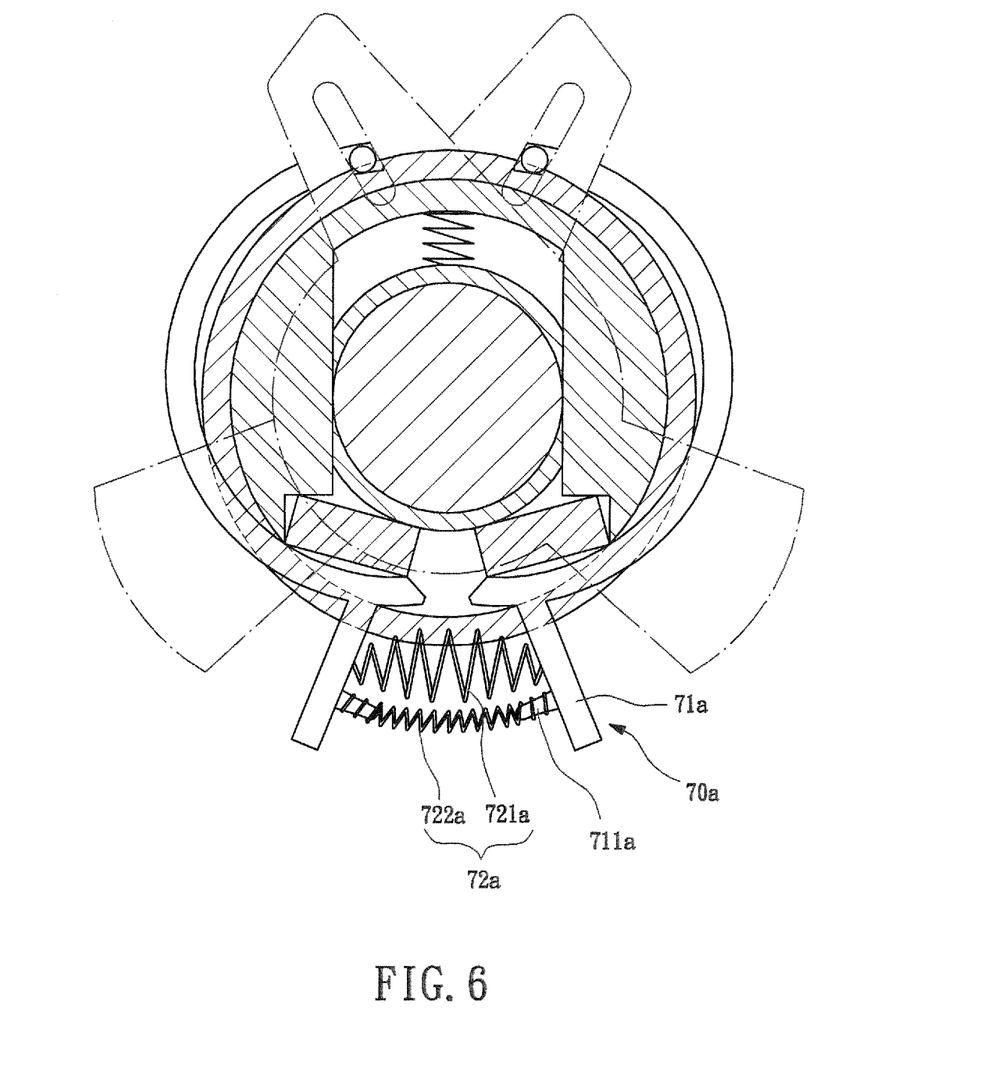
FIG. 6 is a cross-sectional view showing a second example of the limiting structure according to the present invention.

Referring to FIG. 6, a second example of the limiting structure according to the present invention is shown. In this example, description is given to the limiting structure 70a of the weight assembly 40 for illustrative purposes and this description is also applicable to the limiting structure of the weight assembly 30 if desired. The limiting structure 70a comprises two retention members 71a each forming a peg 711a. An elastic element 72a comprises two elastic components 721a, 722a that are arranged between the retention members 71a and have different elastic coefficients. The elastic component 722a has two ends respectively attached to and supported by the pegs 711a.

Figure 7:
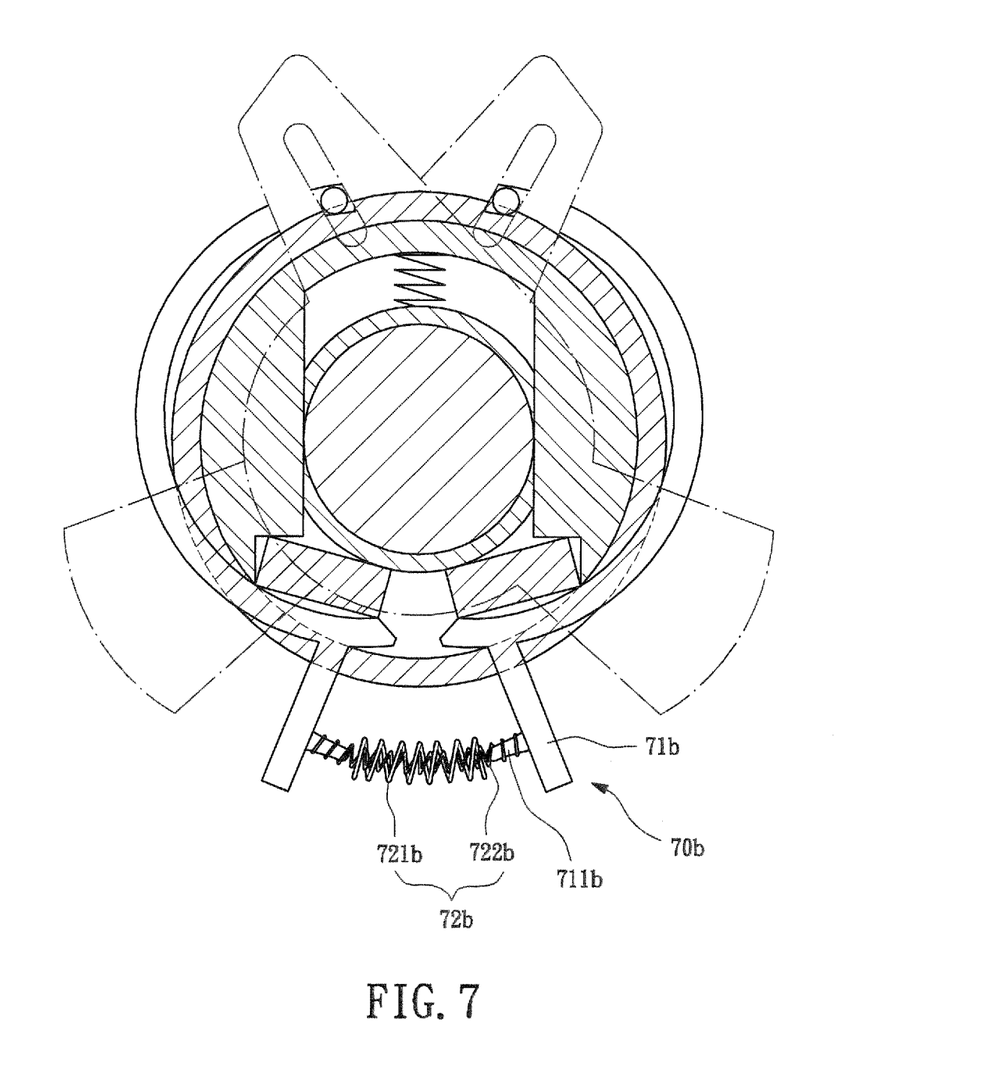
FIG. 7 is a cross-sectional view showing a third example of the limiting structure according to the present invention.

Referring to FIG. 7, a third example of the limiting structure according to the present invention is shown. The limiting structure 70b of this example comprises two retention members 71b each forming a peg 711b. An elastic element 72b comprises two elastic components 721b, 722b that are of different elastic coefficients. The elastic component 722b has two ends respectively attached to and supported by the pegs 711b, and the elastic components 721b is fit over and encompasses the elastic components 722b.

Figure 8:
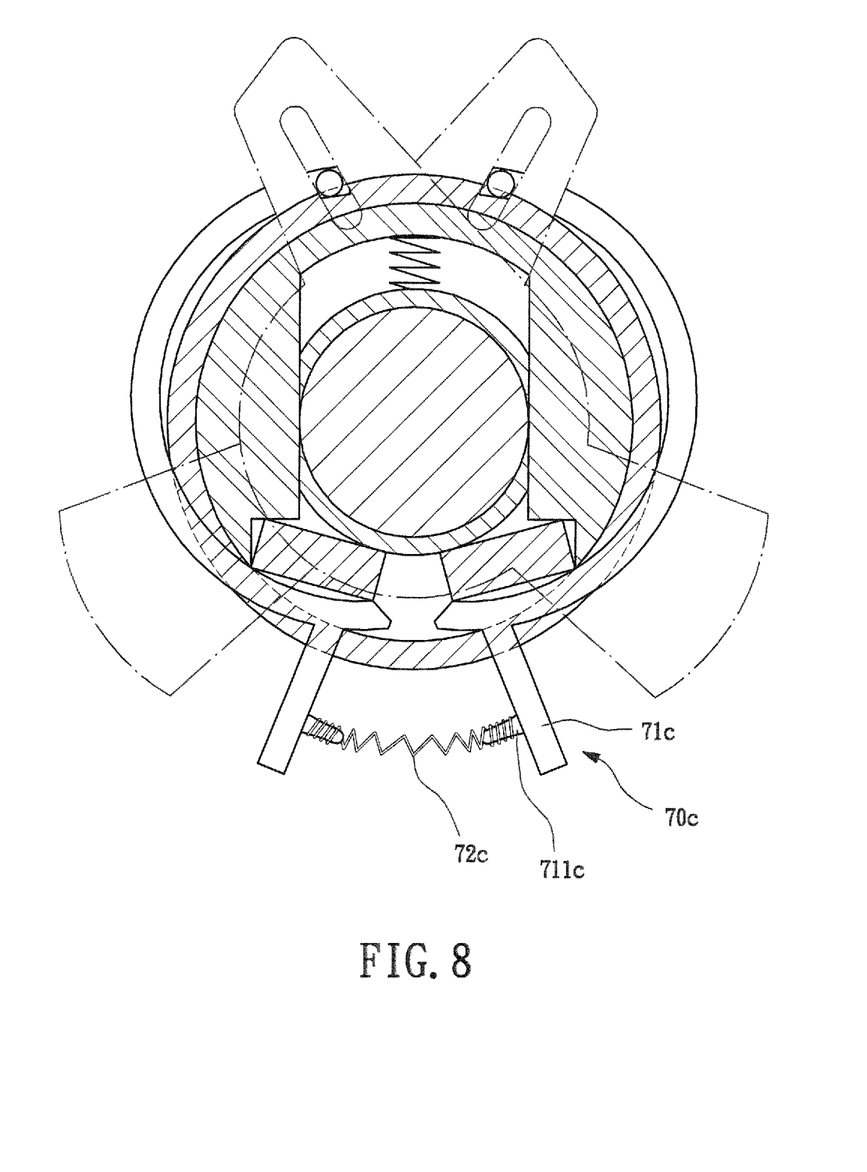
FIG. 8 is a cross-sectional view showing a fourth example of the limiting structure according to the present invention.

Referring to FIG. 8, a fourth example of the limiting structure according to the present invention is shown. The limiting structure 70c of this example comprises two retention members 71c each forming a peg 711c. The elastic element 72c is configured to show a variable elastic coefficient that varies from opposite ends toward a center of the elastic element. The opposite ends of the elastic element 72c are respectively attached to and supported by the pegs 711c.

Figure 9:
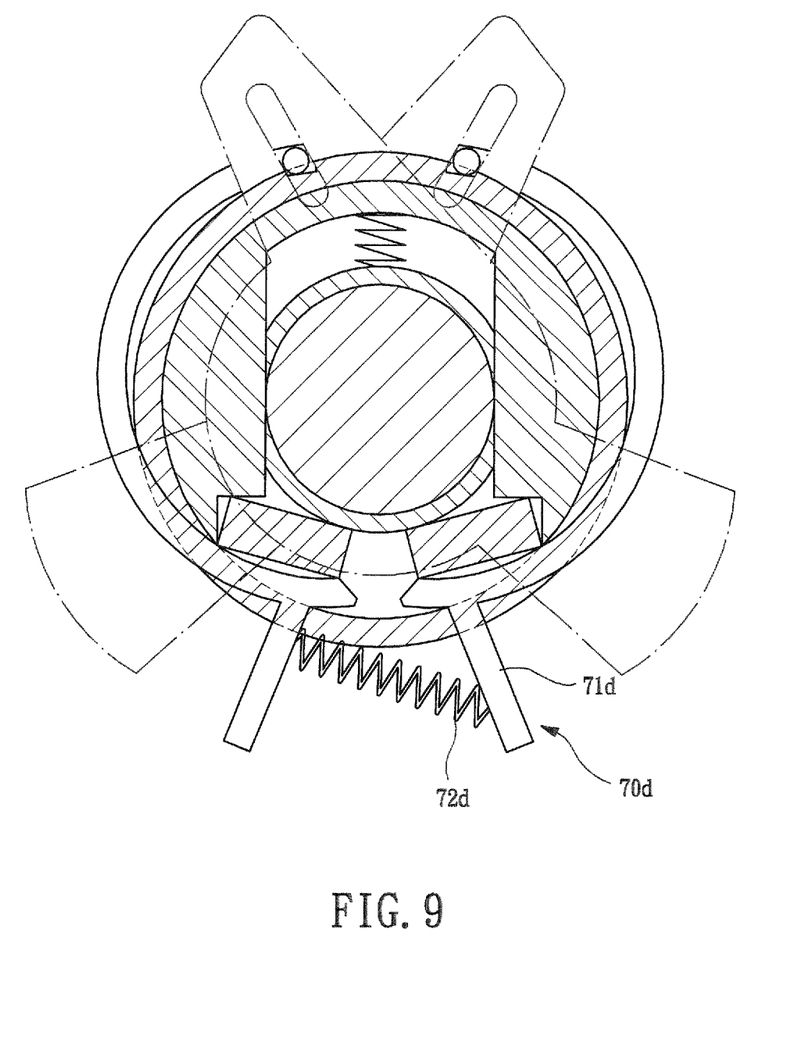
FIG. 9 is a cross-sectional view showing a fifth example of the limiting structure according to the present invention.
Figure 10:
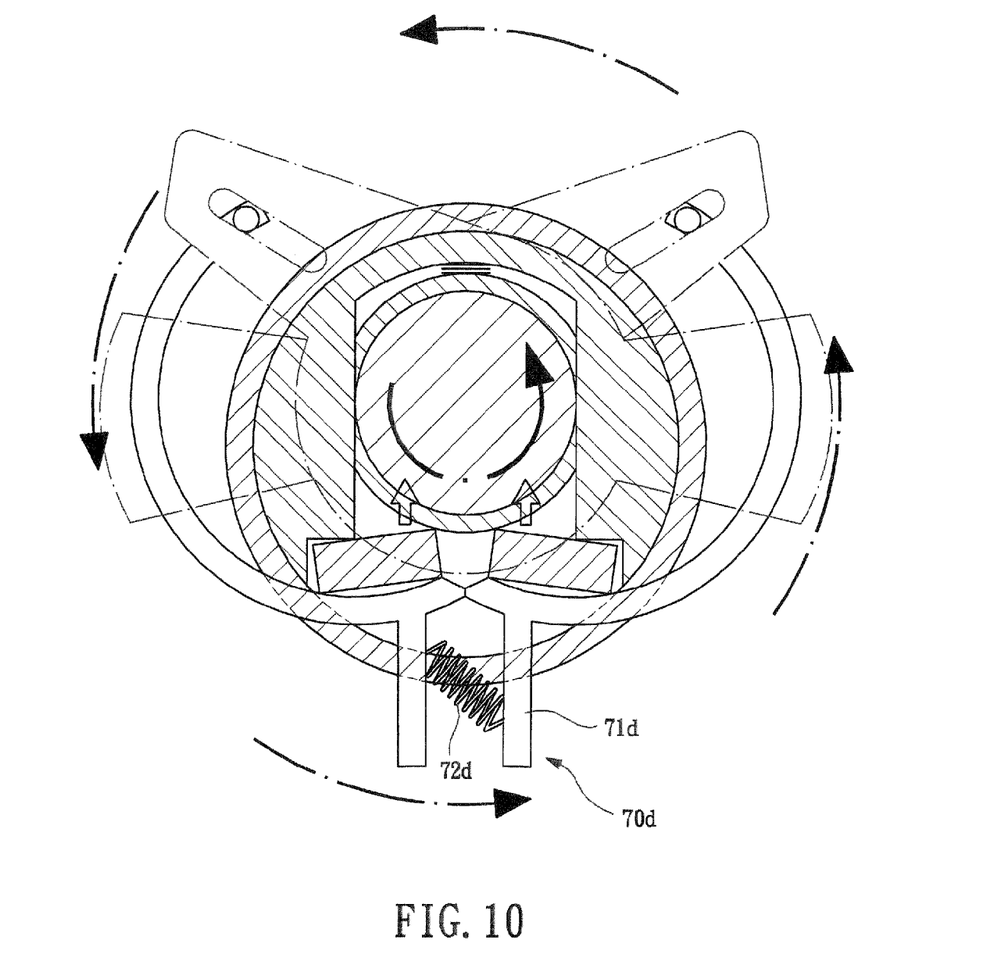
FIG. 10 is a cross-sectional view illustrating the operation of the fifth example of the limiting structure according to the present invention.

Referring to FIGS. 9 and 10, a fifth example of the limiting structure according to the present invention is shown. The limiting structure 70d of this example comprises two retention members 71d between which an elastic element 72d is arranged in an inclined manner. This similarly helps controlling preciseness of variable transmission, helps increasing available transmission positions, facilitates the weight assemblies returning back to home positions, and is suitable for high horsepower applications.

Figure 11:
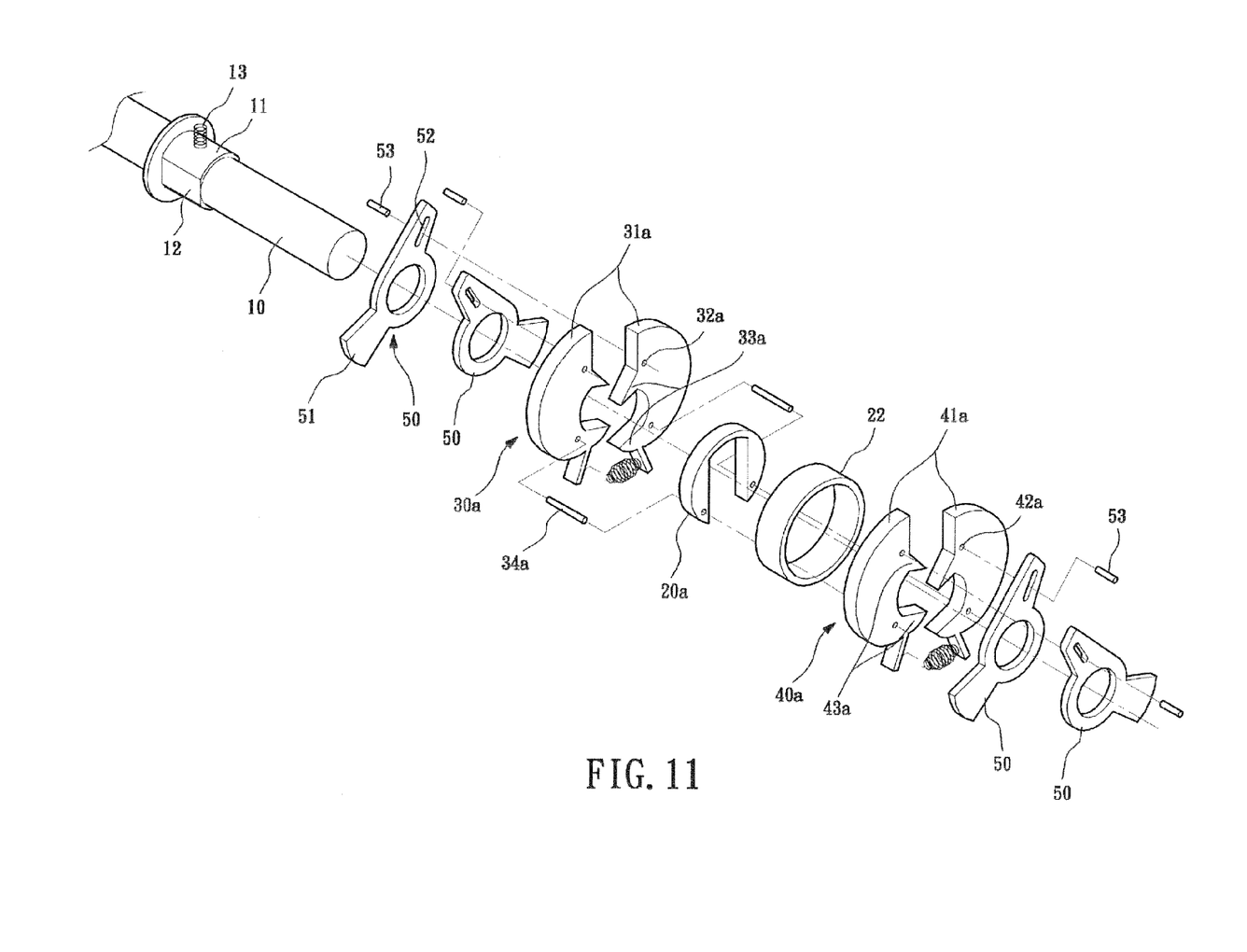
FIG. 11 is an exploded view showing a second embodiment of weight assembly according to the present invention.
Figure 12:
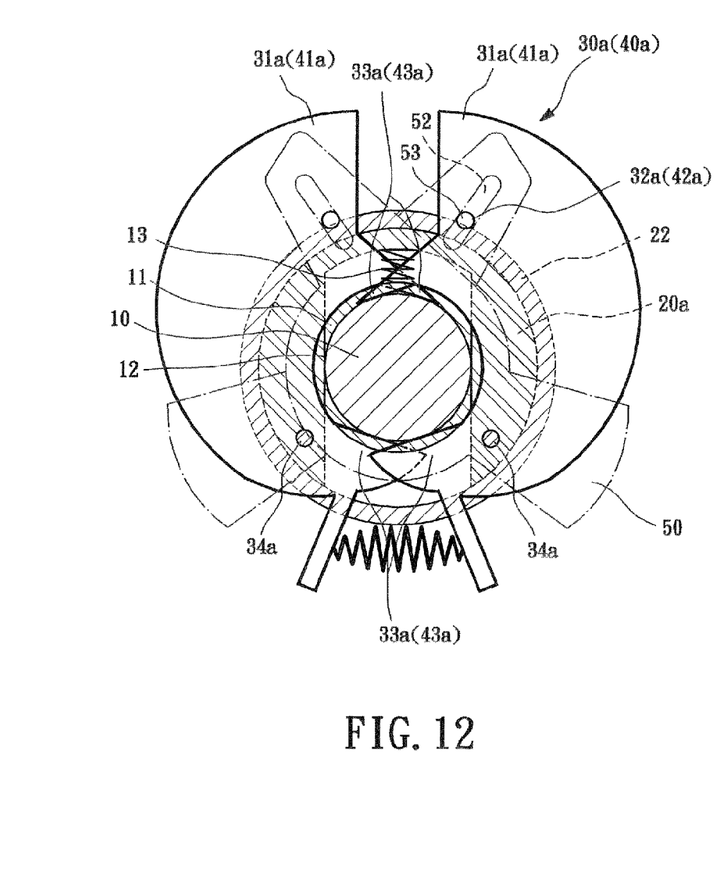
FIG. 12 is a cross-sectional view of FIG. 11 in an assembled form.

Referring to FIGS. 11 and 12, a second embodiment of the weight assembly according to the present invention is shown. The weight assembly 30a, 40a of this embodiment omits the driving portion of the previous embodiment and comprises two weight blocks 31a, 41a, which form a pivot connection portion 32a, 42a. The pivot connection portion 32a is connected by pins 53 to the traction sections 52 of the balance weights 50. The weight block 31a, 41a forms engagement sections 33a, 43a at opposite locations and the engagement sections 33a, 43a respectively engage upper and lower sides of the input shaft 10. Two pins 34a are set to respectively extend through the weight blocks 31a, the centrifugal saddle 20a, and the weight blocks 41a, so that the weight blocks 31a, 41a move in synchronization with the centrifugal saddle 20a.

Figure 13:
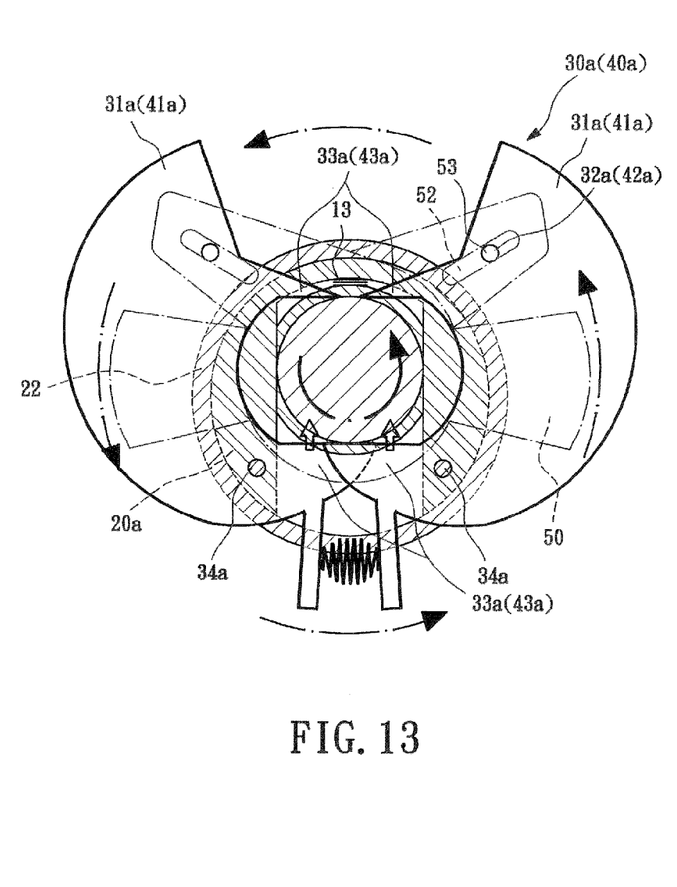
FIG. 13 is a cross-sectional view illustrating the operation of the assembly of FIG. 11.

Referring to FIG. 13, the operation of the second embodiment of the weight assembly according to the present invention is illustrated. When the input shaft 10 rotates, a centrifugal force is induced on the weight assemblies 30a, 40a to cause the weight blocks 31a, 41a to move outward and thus widely open. Due to the engagement sections 33a, 43a of the weight blocks 31a, 41a respectively engaging upper and lower sides of the input shaft 10, the centrifugal saddle 20a and the outer ring 22 are caused to move with respect to the flat sections 12 of the carrying seat 11 in a vertical direction (as viewed in FIG. 13). When the centrifugal saddle 20 moves downward, the elastic body 13 is compressed on the carrying seat 11, and the outer ring 22 makes positional variation that automatically adjusts eccentricity with respect to the input shaft 10.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An automatic transmission eccentric shaft, comprising:
   an input shaft, which is adapted to receive power input from a prime mover to rotate, the input shaft forming two flat sections on opposite sides;
   a centrifugal saddle, which is fit over the flat sections and is movable with respect to the input shaft, an elastic body being arranged between the centrifugal saddle and the input shaft;
   a weight assembly which is arranged at one side of the centrifugal saddle and comprising:
   two weight blocks, each of the weight blocks forming engagement sections, which are respectively set in engagement with the input shaft and
   two pins respectively extending through the weight blocks and the centrifugal saddle, the weight assembly forming an openable pivot connection portion, the weight assembly selectively driving the movement of the centrifugal saddle with respect to the input shaft; and
   a balance weight, which is arranged at one side of the weight assembly and is coupled to the pivot connection portion of the weight assembly characterized in that the weight assembly forms a limiting structure, which comprises two retention members and an elastic element arranged between the retention members; whereby the limiting structure helps controlling preciseness of variable transmission, helps increasing available transmission positions, and facilitates the weight assemblies returning back to home positions.

2. The automatic transmission eccentric shaft according to claim 1, wherein another weight assembly is arranged at an opposite side of the centrifugal saddle, driving portion extending through and supporting said another weight assembly.

3. The automatic transmission eccentric shaft according to claim 1, wherein the elastic element has a variable elastic coefficient.

4. The automatic transmission eccentric shaft according to claim 1, wherein the retention members forms mounting sections.

5. The automatic transmission eccentric shaft according to claim 4,
   wherein the mounting sections comprise pegs, the elastic element comprising two elastic components having different elastic coefficients, one of the elastic components having two ends respectively attached to the pegs.

6. The automatic transmission eccentric shaft according to claim 4,
   wherein the mounting sections comprise pegs, the elastic element comprising two elastic components having different elastic coefficients, one of the elastic components having two ends respectively attached to the pegs, the remaining one of the elastic components being fit over and encompassing said one of the elastic components.

7. The automatic transmission eccentric shaft according to claim 4,
   wherein the mounting sections comprise pegs, the elastic element having a variable elastic coefficient that varies from two ends of the elastic element toward a center of the elastic element, the two ends of the elastic element being respectively attached to the pegs.

8. The automatic transmission eccentric shaft according to claim 1, wherein the elastic element is arranged in an inclined manner between the retention members.

9. The automatic transmission eccentric shaft according to claim 1,
   wherein the weight assembly comprises two driving portions extending through the centrifugal saddle.

* * * * *